US012546254B1

(12) United States Patent
Xu (10) Patent No.: US 12,546,254 B1
(45) Date of Patent: Feb. 10, 2026

(54) AIRCRAFT ENGINE ENTRAINED PARTICLE REMOVAL SYSTEM AND METHOD (71) Applicant: RTX Corporation, Farmington, CT (US)

(72) Inventor: JinQuan Xu, East Greenwich, RI (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/213,938

(22) Filed: May 20, 2025

(51) Int. Cl.
*F02C 7/052* (2006.01)
*B64C 11/14* (2006.01)
*B64D 33/02* (2006.01)

(52) U.S. Cl.
CPC .............. *F02C 7/052* (2013.01); *B64C 11/14* (2013.01); *B64D 33/02* (2013.01); *B64D 2033/022* (2013.01); *B64D 2033/0246* (2013.01); *F05D 2220/323* (2013.01); *F05D 2260/607* (2013.01)

(58) Field of Classification Search
CPC ......... F02C 7/052; B64C 11/14; B64D 33/02; B64D 2033/022; B64D 2033/0246; F05D 2220/323; F05D 2260/607
See application file for complete search history.

(56) References Cited

U.S. PATENT DOCUMENTS

| 2,670,912 | A | 3/1954 | Lindsey | |
|---|---|---|---|---|
| 9,206,740 | B2 * | 12/2015 | Wong | F02C 7/052 |
| 10,883,380 | B2 * | 1/2021 | Roberge | F01D 25/02 |
| 11,118,457 | B2 * | 9/2021 | Ivakitch | F04D 29/58 |
| 11,261,788 | B2 * | 3/2022 | Koka | B01D 51/02 |

FOREIGN PATENT DOCUMENTS

GB          682868 A    11/1952

* cited by examiner

*Primary Examiner* — Kyle Robert Thomas
(74) *Attorney, Agent, or Firm* — Getz Balich LLC (57) ABSTRACT

A method of directing particles entrained within an airflow disposed to enter a gas turbine engine of an aircraft is provided. The gas turbine engine includes a nose cone, a fan section, a compressor inlet, a compressor section, and a turbine section. The nose cone is fixed for rotation with the fan section. The method includes: providing an entrained particle removal (EPR) system configured to inject a fluid outward from the nose cone from a plurality of nozzles engaged with the nose cone, wherein the nozzles are spaced apart from one another around a circumference of the nose cone; and controlling the EPR system to inject the fluid from the plurality of nozzles into the airflow. The particles wetted by the injected fluid are subject to centrifugal force in and aft of the fan section and are directed radially outward of the compressor inlet.

20 Claims, 9 Drawing Sheets

AIRCRAFT ENGINE ENTRAINED PARTICLE REMOVAL SYSTEM AND METHOD

BACKGROUND OF THE INVENTION

1. Technical Field

The present disclosure relates to aircraft engines in general and to aircraft including mechanisms for removing entrained particles from an engine in particular.

2. Background Information

Particles of various materials such as sand and dust and chemicals that enter a turbine engine can be harmful, for example potentially causing component surface erosion and/or corrosion, clogging of cooling holes and passages, to name a few. Particulate contamination primarily occurs at takeoff and landing due to the higher concentration of dirt particles near the ground. Typically, particles are only cleaned from the surfaces of the nacelle and the engine components, which leaves particles in the air that pass into the turbine engine. An improved system for removing entrained particles from air passing within an aircraft turbine engine would be beneficial.

SUMMARY

A method of directing particles entrained within an airflow disposed to enter a gas turbine engine of an aircraft is provided. The gas turbine engine included a nose cone, a fan section, a compressor inlet, a compressor section, and a turbine section. The compressor section and the turbine section are in communication with a core gas path. The nose cone is fixed for rotation with the fan section. The method includes: providing an entrained particle removal (EPR) system configured to inject a fluid outward from the nose cone from a plurality of nozzles engaged with the nose cone; and controlling the EPR system to inject the fluid from the plurality of nozzles during at least one predetermined segment of a flight mission of the aircraft, the flight mission including an idling segment, a taxiing segment, a take-off segment, an ascent segment, a descent segment, and a landing segment. The particles wetted by the injected fluid are subject to centrifugal force in and aft of the fan section and are directed radially outward of the compressor inlet.

In any of the aspects or embodiments described above and herein, the gas turbine engine may be a turbofan engine disposed within a nacelle, and a bypass duct may be disposed radially outside of the core gas path. Particles wetted by the injected fluid are subject to centrifugal force in and aft of the fan section and are directed radially outward of the compressor inlet and into the bypass duct.

In any of the aspects or embodiments described above and herein, the fluid is provided from a fluid source that may be located externally to the nose cone.

In any of the aspects or embodiments described above and herein, the gas turbine engine may be in an open rotor configuration having an engine enclosure disposed radially outside of the compressor section and the turbine section. The particles wetted by the injected fluid are subject to centrifugal force in and aft of the fan section and are directed radially outward of the compressor inlet and outside of the engine enclosure.

In any of the aspects or embodiments described above and herein, the plurality of nozzles may be spaced apart from one another around a circumference of the nose cone.

In any of the aspects or embodiments described above and herein, the step of controlling the EPR system may include controlling a volumetric fluid flow rate of the fluid injected from the plurality of nozzles.

In any of the aspects or embodiments described above and herein, the method may further include sensing the airflow for the particles entrained within the airflow, and producing a sensor signal representative of the entrained particles within the airflow. The step of controlling the EPR system may include controlling a volumetric fluid flow rate of the fluid injected from the plurality of nozzles based on the sensor signal representative of the entrained particles within the airflow.

In any of the aspects or embodiments described above and herein, the step of controlling the EPR system may include controlling a magnitude of motive force applied to the fluid injected from the plurality of nozzles based on operating conditions of the gas turbine engine.

In any of the aspects or embodiments described above and herein, the plurality of nozzles may include a first nozzle and a second nozzle. The step of controlling the EPR system may include applying a first magnitude of motive force to the fluid injected from the first nozzle, and applying a second magnitude of motive force to the fluid injected from the second nozzle, wherein the first magnitude is greater than the second magnitude.

In any of the aspects or embodiments described above and herein, the method may include heating the fluid to a temperature above a freezing point of the fluid.

According to an aspect of the present disclosure, a method of directing particles entrained within an airflow disposed to enter a gas turbine engine of an aircraft is provided. The gas turbine engine includes a nose cone, a fan section, a compressor inlet, a compressor section, and a turbine section. The compressor section and the turbine section are in communication with a core gas path. The nose cone is fixed for rotation with the fan section. The method includes: providing an entrained particle removal (EPR) system configured to inject a fluid outward from the nose cone from a plurality of nozzles engaged with the nose cone, wherein the plurality of nozzles are spaced apart from one another around a circumference of the nose cone; and controlling the EPR system to inject the fluid from the plurality of nozzles into the airflow. The particles wetted by the injected fluid are subject to centrifugal force in and aft of the fan section and are directed radially outward of the compressor inlet.

In any of the aspects or embodiments described above and herein, the step of controlling the EPR system to inject the fluid from the plurality of nozzles into the airflow may utilize atmospheric data or weather data input into the EPR system.

According to an aspect of the present disclosure, an aircraft is provided that includes a gas turbine engine, an entrained particle removal (EPR) system, and a controller. The gas turbine engine has a nose cone, a fan section, a compressor inlet, a compressor section, and a turbine section arranged along an axial centerline. The compressor section and the turbine section are in communication with a core gas path. The EPR system includes a plurality of nozzles engaged with the nose cone. The nozzles are configured to inject a fluid outward from the nose cone. The controller is in communication with the EPR system and a non-transitory memory storing instructions. The instructions when executed cause the controller to control the EPR system to provide the fluid to the nozzles for injection outward from the nozzles. The gas turbine engine is configured such that particles entrained within an airflow disposed to engage the gas turbine engine that are wetted by the fluid injected by the EPR system are directed radially outside of the compressor inlet.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
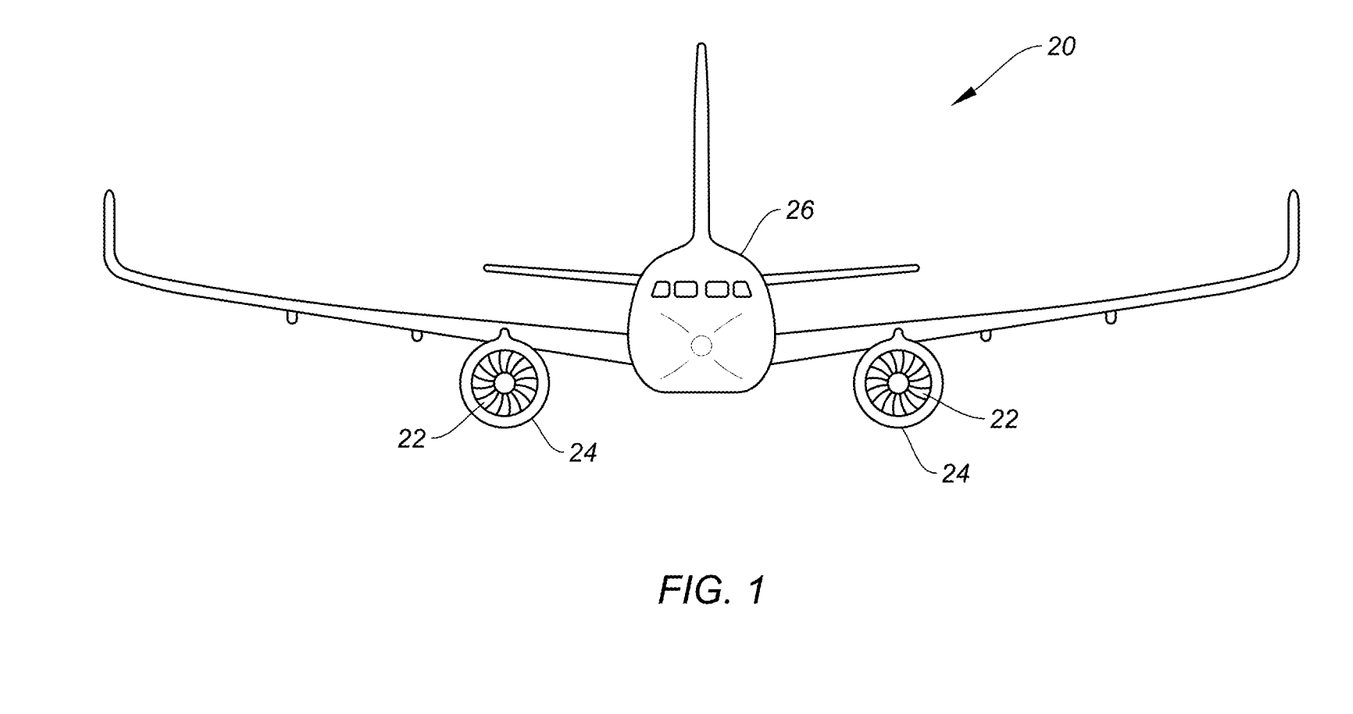
FIG. 1 is a diagrammatic view of an aircraft having a pair of nacelles and engines.

FIG. 1 is a diagrammatic view of an aircraft 20 that includes a pair of turbofan type gas turbine engines 22, a pair of nacelles 24, and a fuselage 26.

Figure 2:
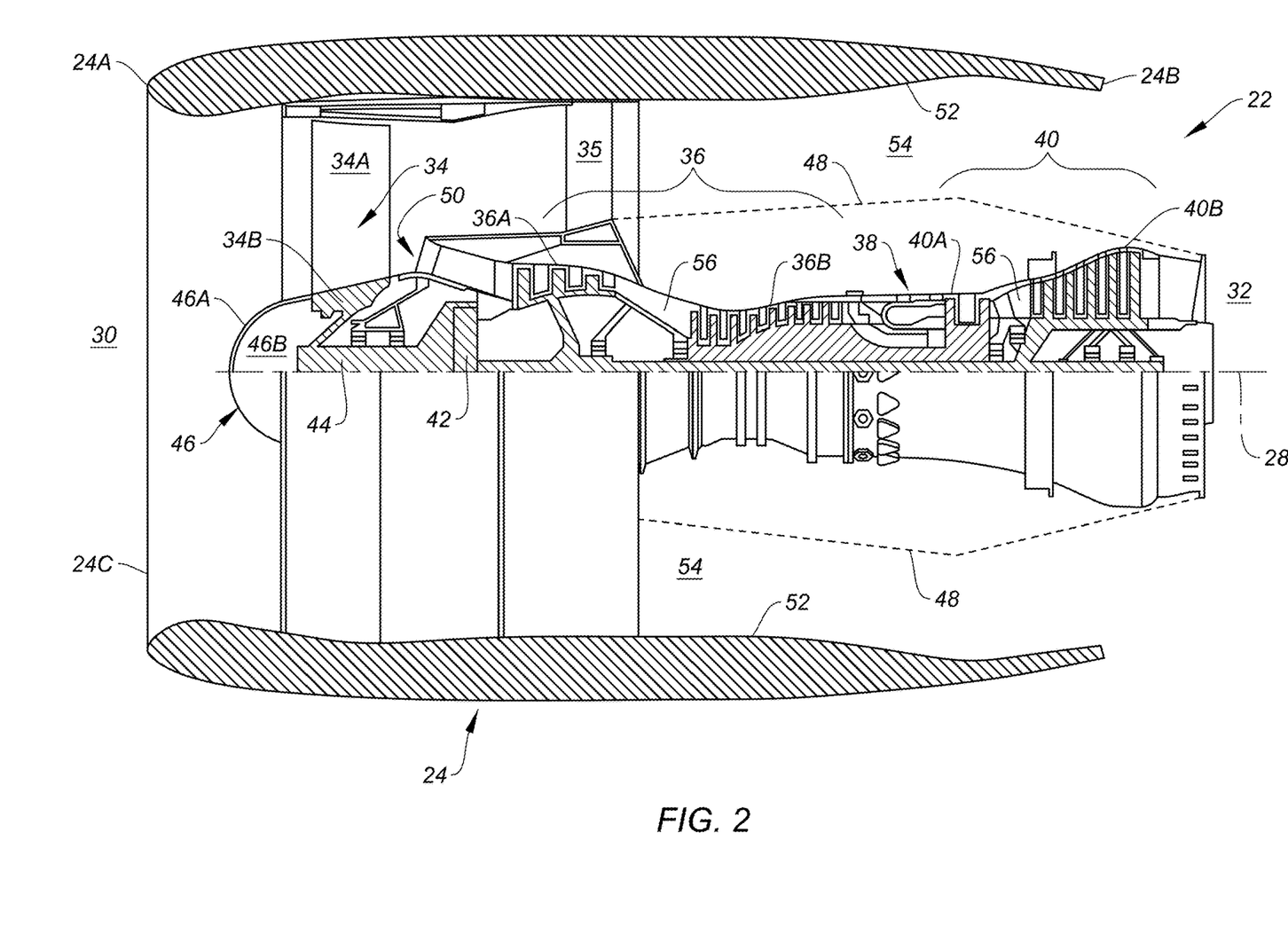
FIG. 2 is a diagrammatic sectional view of a gas turbine engine embodiment.

FIG. 2 shows a partially sectioned diagrammatic view of a geared turbofan gas turbine engine 22 disposed within a nacelle 24. The gas turbine engine 22 extends along an axial centerline 28 between an upstream airflow inlet 30 and a downstream airflow exhaust 32. The gas turbine engine 22 includes a fan section 34, a compressor section 36, a combustor section 38, and a turbine section 40. The fan section 34 includes a fan rotor stage that has a plurality of fan blades 34A extending radially outward from a hub 34B. The compressor section 36 includes a low-pressure compressor (LPC 36A) and a high-pressure compressor (HPC 36B). The turbine section 40 includes a high-pressure turbine (HPT 40A) and a low-pressure turbine (LPT 40B). The engine sections are arranged sequentially along the axial centerline 28. The fan section 34 is connected to a geared architecture 42, for example, through a fan shaft 44. A nose cone 46 projects axially forward from the fan section 34 and is disposed for rotation with the fan section 34. The nose cone 46 includes a wall 46A that defines a nose cone interior compartment 46B.

FIG. 2 diagrammatically illustrates a nacelle 24 disposed radially outside of the engine 22. The nacelle 24 may be described as extending axially between a forward end 24A and an aft end 24B. The nacelle 24 includes an inlet 24C. Aft of the fan section 34, a bypass flow path inner structure 48 (shown in part by dashed line) is disposed radially outside of a compressor inlet 50, the compressor section 36, the combustor section 38, and the turbine section 40. A bypass flow path outer structure 52 (diagrammatically shown as part of the nacelle 24) is spaced apart from and disposed radially outside the bypass flow path inner structure 48. The annular region disposed between the bypass flow path inner and outer structures 48, 52 forms a bypass duct 54 (sometimes referred to as a "fan duct"). FIG. 2 illustrates a strut 35 extending between the bypass flow path inner and outer structures 48, 52

Still referring to FIG. 2, during operation of the turbofan engine 22, air enters the nacelle 24 and travels aft to the fan section 34. The inlet air is worked by the fan section 34. A portion of that worked air ("bypass air") travels aft and enters the bypass duct 54 and provides a portion of the thrust produced by the engine 22. The remainder of the air worked by the fan section 34 enters the compressor inlet 50, subsequently entering a core gas path 56 through the compressor section 36, combustor section 38, and the turbine section 40 before exiting the engine 22. The terms "forward" or "upstream" and "aft" or "downstream" are used herein to indicate the relative position of a component or surface. In a conventional axial gas turbine engine 22 such as that shown in FIG. 2, the fan section 34 is "forward" or "upstream" of the compressor section 36 and the turbine section 40 is "aft" or "downstream" of the compressor section 36. The terms "inner radial" and "outer radial" refer to relative radial positions from the engine axial centerline 28. An inner radial component or path is disposed radially closer to the engine axial centerline 28 than an outer radial component or path.

The gas turbine engine 22 diagrammatically shown in FIG. 2 is an example provided to facilitate the description herein. The present disclosure is not limited to the two-spool engine configuration shown.

Figure 3:
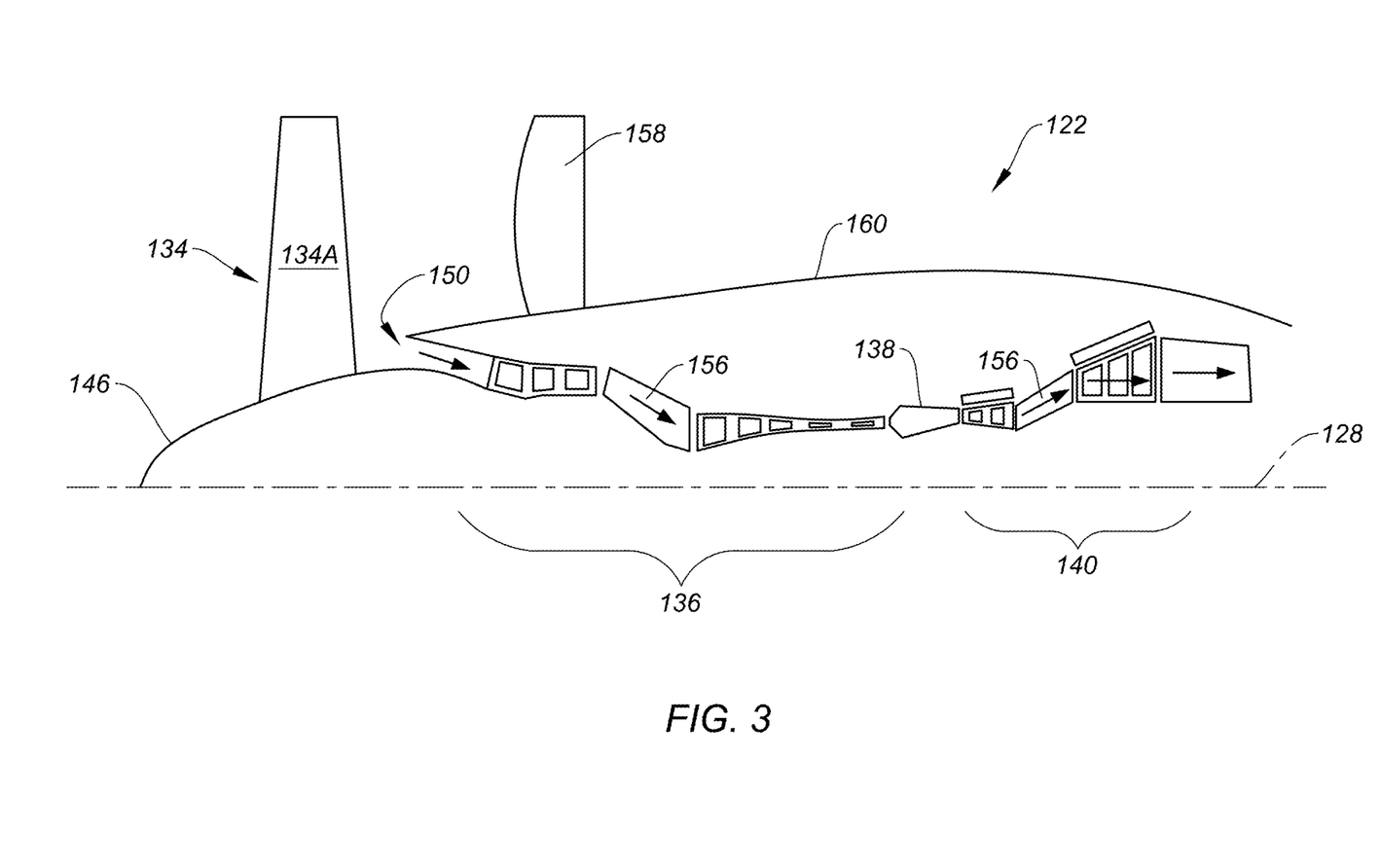
FIG. 3 is a diagrammatic sectional view of a gas turbine engine embodiment.

Referring to FIG. 3, embodiments of the present disclosure may be utilized with a gas turbine engine 122 having an open rotor configuration with swirl recovery vanes 158. The gas turbine engine 122 diagrammatically shown in FIG. 3 includes a fan section 134, swirl recovery vanes 158, a compressor inlet 150, a compressor section 136, a combustor section 138, and a turbine section 140. The fan section 134 includes a fan rotor stage that has a plurality of fan blades 134A extending radially outward from a hub 134B (see FIG. 5). The engine sections are arranged sequentially along the axial centerline 128. The compressor, combustor, and turbine sections 136, 138, 140 of the engine 122 define the core of the engine 122. An engine enclosure 160 is disposed radially outside of the core of the engine 122. The fan section 134 may be connected to a geared architecture, for example, through a fan shaft. A nose cone 146 projects axially forward from the fan section 134. The nose cone 146 is disposed for rotation with the fan section 134. The nose cone 146 includes an exterior wall 146A that defines a nose cone interior compartment 146B; e.g., see FIG. 5.

Still referring to FIG. 3, during operation of the open rotor engine 122, air encounters and is worked by the fan section 134. A first portion of the air worked by the fan section 134 travels aft, through the swirl recovery vanes 158, and outside of the engine enclosure 160. A second portion of the air worked by the fan section 134 enters the compressor inlet 150, subsequently entering the core gas path 156 through the compressor, combustor, and turbine sections 136, 138, 140 before exiting the engine 122.

As described herein, particles ingested into the core of the engine 22, 122 (e.g., the compression, combustion, and turbine sections) can be detrimental to the operation and durability of the engine 22, 122. Embodiments of the present disclosure include an entrained particle removal ("EPR") system 62. The present disclosure EPR system 62 may be utilized with a variety of different gas turbine engine configurations (including but not limited to the turbofan engine configuration 22 like that shown in FIG. 2 and the open rotor gas turbine engine configuration 122 like that shown in FIG. 3) to reduce the amount of particulate matter entrained within the core gas that enters the core gas path 56, 156.

Figure 4:
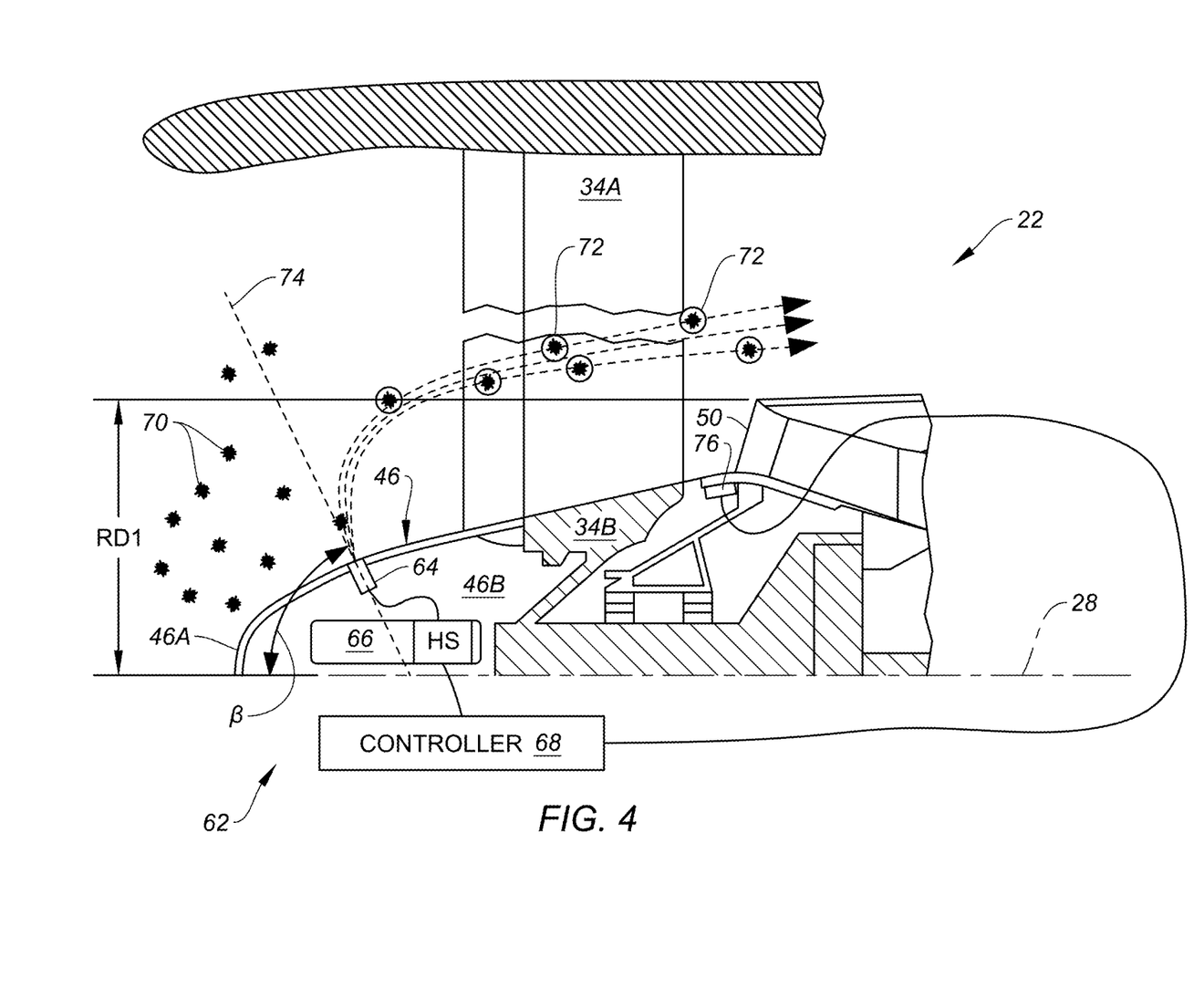
FIG. 4 is an enlarged diagrammatic sectional view of the gas turbine engine embodiment shown in FIG. 2, now including a present disclosure particle removal system embodiment.
Figure 5:
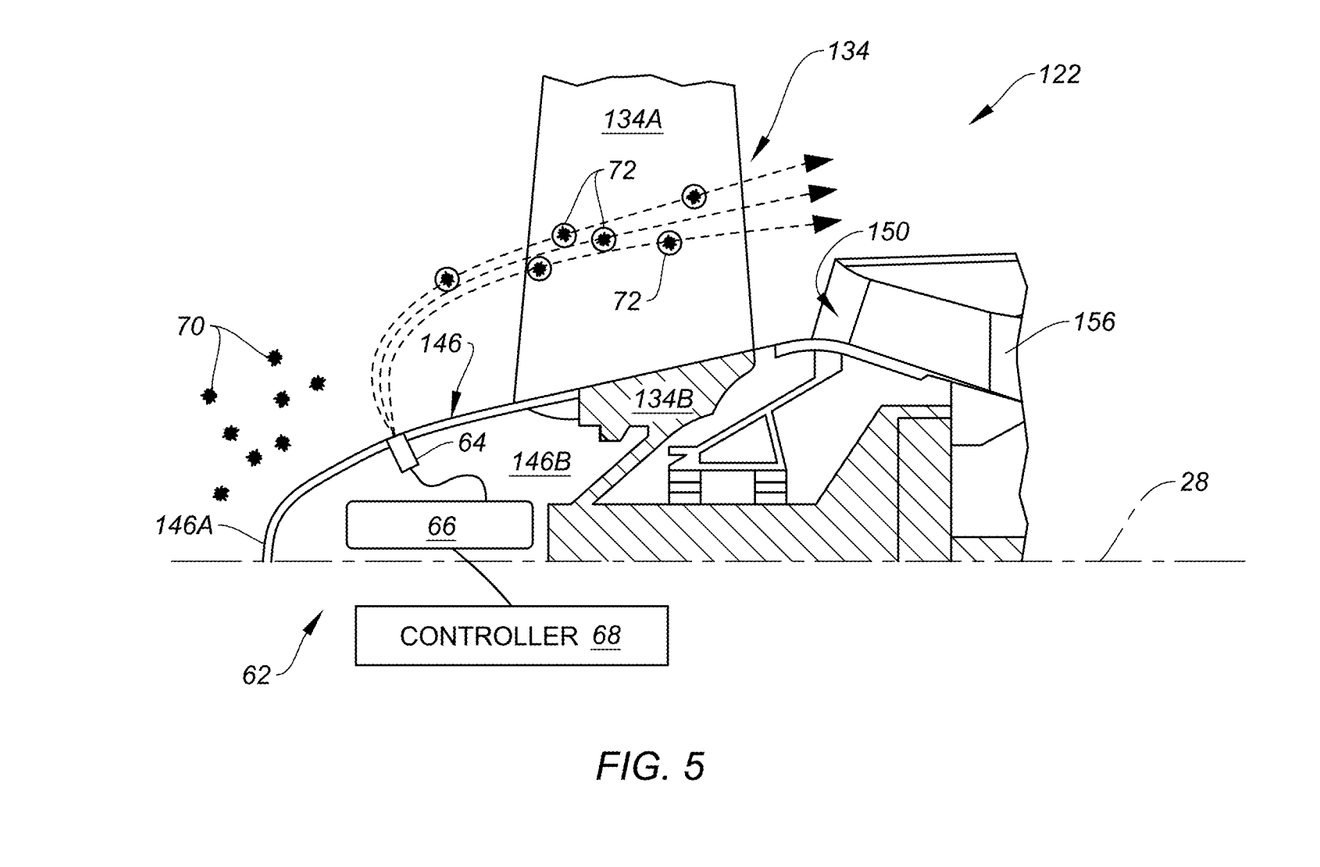
FIG. 5 is an enlarged diagrammatic sectional view of the gas turbine engine embodiment shown in FIG. 3, now including a present disclosure particle removal system embodiment.
Figure 6:
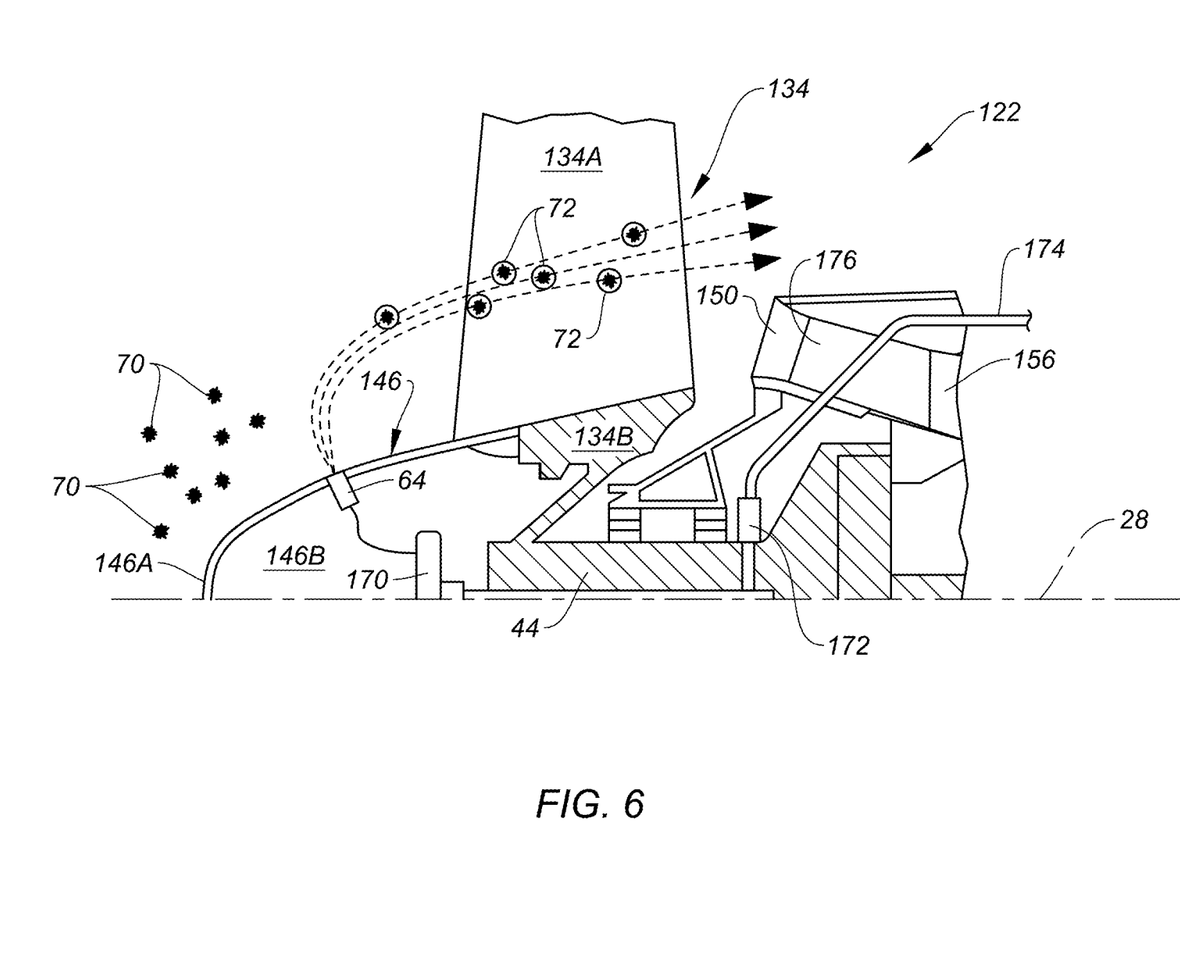
FIG. 6 is an enlarged diagrammatic sectional view of a gas turbine engine embodiment like that shown in FIGS. 5 and 3, illustrating another particle removal system embodiment.

Referring to FIGS. 4 and 5, the EPR system 62 includes a plurality of nozzles 64 for fluid injection and a fluid source 66. FIG. 4 diagrammatically illustrates a present disclosure EPR system 62 embodiment utilized with a turbofan gas turbine engine 22; e.g., see also FIG. 2. FIGS. 5 and 6 diagrammatically illustrate present disclosure EPR system 62 embodiments utilized with an open rotor gas turbine engine 122; e.g., see also FIG. 3. The EPR system 62 is controllable to be in an on-state (fluid flow) or in an off-state (no fluid flow). In the on-state, the volumetric flow rate of the fluid may be altered to suit the application. A controller 68 may be used in the control of the EPR system 62.

Figure 7:
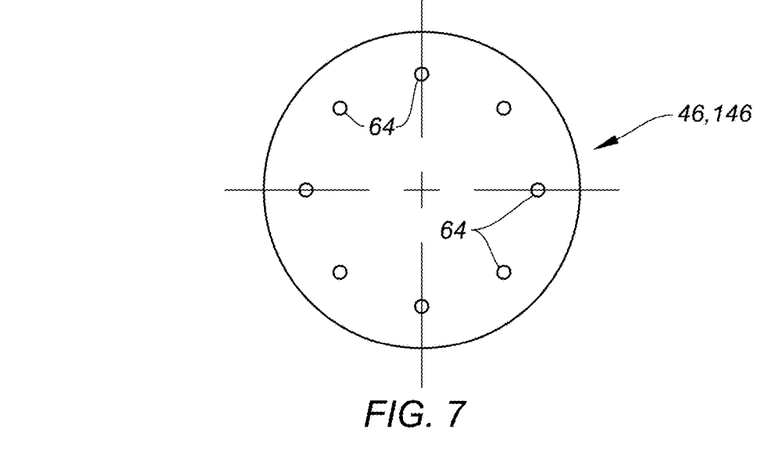
FIG. 7 is a diagrammatic view of a nose cone embodiment.
Figure 8:
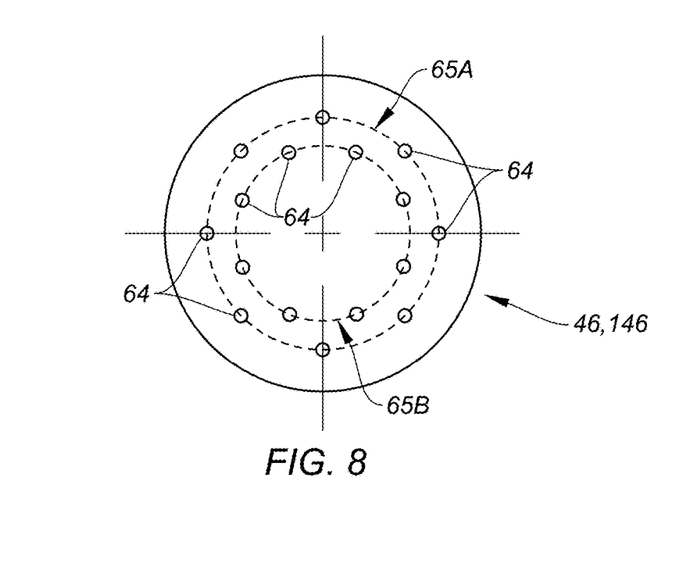
FIG. 8 is a diagrammatic view of a nose cone embodiment.

The plurality of nozzles 64 are engaged with the nose cone 46, 146 and are circumferentially spaced apart from one another. In some embodiments, the nozzles 64 may be uniformly spaced apart from one another around the circumference, and in other embodiments the nozzles 64 may be non-uniformly spaced apart from one another around the circumference. In some embodiments, the plurality of nozzles 64 may be disposed in a single row; i.e., at a single axial position as diagrammatically shown in FIG. 7. In some embodiments, the plurality of nozzles 64 may be disposed in a plurality of rows. For example, FIG. 8 illustrates the plurality of nozzles 64 disposed in two rows; i.e., a first row 65A of nozzles 64 disposed at a first axial position and a second row 65B of nozzles 64 disposed at a second axial position.

Each nozzle 64 is configured to receive a flow of fluid directly or indirectly from the fluid source 66. A circumferentially extending manifold (not shown) that is configured to receive fluid from the fluid source 66 and distribute the fluid to the nozzles 64 is an example of an indirect path between the fluid source 66 and the nozzles 64. In some embodiments, the flow of fluid from the fluid source 66 may be produced by a pump (not shown) that draws the fluid from a reservoir and directs it to the nozzles 64. In some embodiments, the flow of fluid from the fluid source 66 may be produced by a pressurized reservoir and controllable valving (not shown). FIGS. 4 and 5 diagrammatically illustrate the fluid source 66 as a reservoir disposed in the nose cone 46, 146. The present disclosure is not limited to such a fluid source. For example, FIG. 6 diagrammatically illustrates a manifold 170 that rotates with the nose cone 146. The manifold 170 is in fluid communication with a fluid source 66 disposed elsewhere in the engine 22, 122 or in the aircraft 20. In some embodiments, the gas turbine engine 22, 122 itself may produce the fluid; e.g., water produced by an engine that combusts hydrogen. FIG. 6 diagrammatically illustrates a fluid coupling device 172 that allows the transfer of fluid between the rotating fan shaft 44 and a source line 174 that extends radially upward and through a strut 176 disposed adjacent the compressor inlet 150. The manifold 170 is in fluid communication with the nozzles 64. To be clear, the example structure (e.g., manifold 170, fluid coupling device 172, source line 174 and the like) diagrammatically shown in FIG. 6 is an example of such a structure and the present disclosure is not limited to this example. In addition, the fluid distribution structure shown in FIG. 6 is diagrammatically illustrated in the context of an open rotor engine 122. The same or a similar structure could be utilized in a turbofan engine 22 configuration. In the turbofan engine 122 configuration (e.g., see FIG. 2), the source line 174 could be routed through the strut 35 extending through the bypass duct 54 and to a reservoir disposed in the nacelle 24 or elsewhere in the aircraft 20 for example.

Referring back to FIGS. 4 and 5, because the nozzles 64 are disposed in the nose cone 46, 146 that rotates during engine 22, 122 operation, the flow of fluid from the fluid source 66 and through the nozzles 64 may be assisted by centrifugal forces acting on the fluid as it passes from the fluid source 66, to, and through the nozzles 64. The present disclosure is not limited to these examples of mechanisms for providing motive force to the fluid. In addition, in some embodiments, the magnitude of the motive force forcing the fluid through the nozzles 64 may be controllable. For example, under certain operating conditions a first magnitude of motive force may be favorable to produce a desired fluid distribution from the nozzles 64, and under other operating conditions a second magnitude of motive force (different from the first magnitude) may be favorable to produce a desired fluid distribution from the nozzles 64. Embodiments of the present disclosure EPR system 62 may be controllable (e.g., using the controller 68) to produce a preferred amount of fluid motive force under given operating conditions. In some embodiments, the motive force applied to certain nozzles may be different than the motive force applied to other nozzles during a given operating condition. For example and using the multiple nozzle row embodiment shown in FIG. 8 as an example, the EPR system 62 may be controllable to produce a first motive force to the fluid nozzles 64 disposed in the first row of nozzles 65A and a second motive force to the fluid nozzles 64 disposed in the second row of nozzles 65B, where the first motive force is different than the second motive force; e.g., first motive force>second motive force or vice versa.

The EPR system 62, including the nozzles 64, is configured to expel fluid radially outward from the nose cone 46, 146 in a manner that causes the fluid to engage with airstream entrained particles 70 (if present) upstream of the fan section 34. The particles 70 engaged with the fluid are referred to hereinafter as "wetted particles 72". The wetted particles 72 may be described as having a mass that is the sum of the mass of the particle 70 and the mass of the fluid engaged with the particle 70. In FIG. 4, the axis along which the nozzle 64 expels fluid (i.e., the "nozzle axis 74") is disposed at an acute angle beta ("β") relative to the axial centerline 28. In some embodiments, the nozzle axis 74 may be perpendicular to the axial centerline 28. As the airflow containing the wetted particles 72 passes through the rotating fan blades 34A, 134A of the fan section 34, 134 the air flow (including the entrained wetted particles 72) is subject to axial and centrifugal forces. The axial forces act on the wetted particles 72 in a direction from forward to aft. The centrifugal forces act on the wetted particles 72 in a direction radial outward from the axial centerline 28; i.e., radially outward from the rotational axis of the fan section 34 and the nose cone 46, 146. The mass of the wetted particles 72 increases the magnitude of the centrifugal forces acting on the wetted particles 72. The radially outward directed forces are understood to urge wetted particles 72 into airflow that tracks radially outside of the compressor inlet 50, 150. As a result, the wetted particles 72 subsequently pass downstream through the bypass duct 54 rather than through the core gas path 56 (i.e., turbofan gas turbine engine 22), or through the swirl recovery vanes 158 and outside the engine enclosure 160 rather than through the core gas path 156; i.e., an open rotor gas turbine engine 122. The present disclosure is not limited to any particular nozzle axis 74 orientation, provided the nozzle axis 74 orientation is such that a substantial amount of the particles 72 that are wetted by the fluid are centrifugally urged outward into the bypass duct 54.

Figure 9:
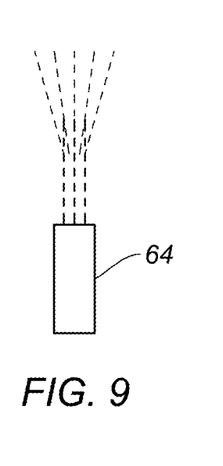
FIG. 9 is a diagrammatic view of a nozzle embodiment.
Figure 10:
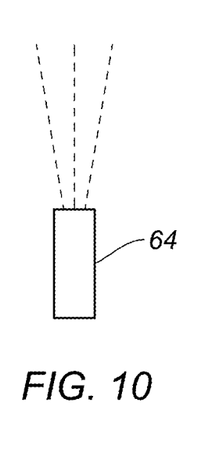
FIG. 10 is a diagrammatic view of a nozzle embodiment.
Figure 11:
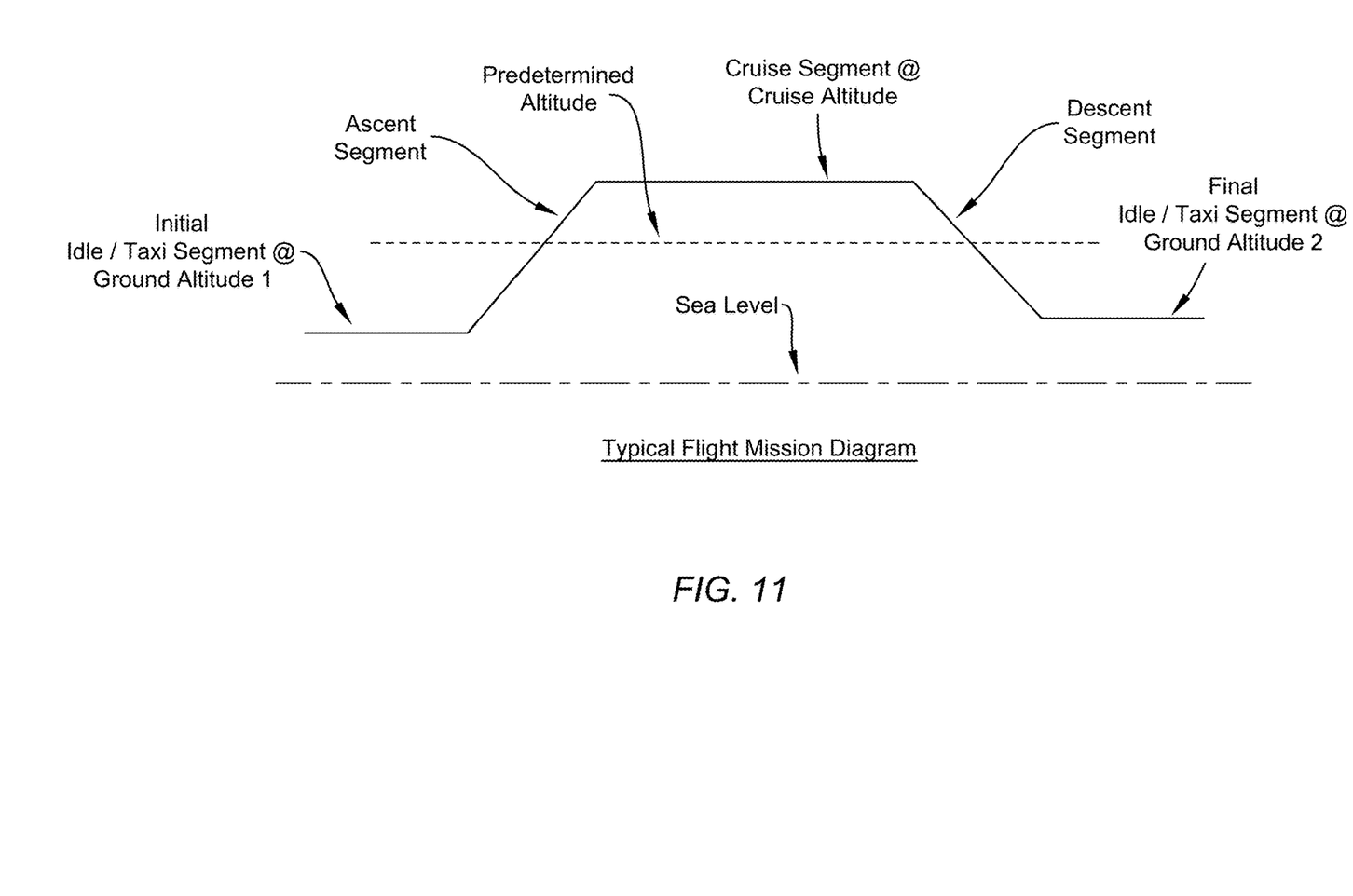
FIG. 11 is a diagrammatic representation of a flight mission.

As stated herein, each nozzle 64 is configured to expel a stream of fluid radially outward from the nose cone 46, 146. The present disclosure is not limited to any particular stream configuration other than one that extends radially outward from the nose cone 46, 146 and produces a circumferential fluid distribution that engages with particles 70 upstream of the fan section 34 that are subsequently forced radially outward of the compressor inlet 50; e.g., a radial distance equal to or greater than "RD1" as shown in FIG. 4. FIG. 9 diagrammatically illustrates a nozzle 64 configured to expel a stream that retains a constant diameter until airflow causes the stream to disperse. FIG. 10 diagrammatically illustrates a nozzle 64 configured to expel a stream that extends outwardly in a spread pattern. Also as noted herein, the nozzles 64 disposed in the nose cone 46, 146 rotate during engine 22, 122 operation. As a result, the fluid pattern exiting the nozzles 64 may be influenced by centrifugal forces acting on the fluid. The present disclosure is not limited to either of these examples. The present disclosure does not require all nozzles 64 to have the same configuration; e.g., different nozzle 64 configurations may be used in combination to produce a favorable fluid distribution pattern.

The fluid utilized in the EPR system 62 may be any fluid that is capable of engaging with particulate matter entrained within the airflow. Water is a non-limiting example of a fluid that may be used. In some embodiments, the fluid may be configured to have a lower freezing point temperature than water.

FIGS. 4 and 5 diagrammatically illustrates the EPR system 62 having a fluid source 66 in the form of a reservoir disposed within nose cone interior compartment 46B, 146B. The present disclosure EPR system 62 is not limited to using a reservoir disposed within nose cone interior compartment 46, 146B. The fluid source 66 may be located anywhere on the aircraft 20 and piped to the nozzles 64 for distribution; e.g., see the example shown in FIG. 6 and described herein.

In some embodiments, the EPR system 62 may include a heat source that is disposed to transfer an amount of thermal energy to the fluid to maintain the fluid above the fluid's freezing temperature. An example of a heat source is an electric heater that is configured to produce thermal energy and transfer it to the EPR system fluid; e.g., "HS"—see FIG. 4. Another example of a heat source is a heat exchanger (not shown) that is configured to transfer thermal energy from an engine fluid (e.g., engine oil) to the EPR system fluid. The present disclosure is not limited to any particular heat source configuration in those embodiments that include a heat source.

As indicated herein, some present disclosure EPR system 62 embodiments may include and/or use a controller 68 to control aspects of the EPR system 62. In some embodiments, the control functionality of the EPR system described herein may be performed by a controller that exists within the engine system or aircraft; e.g., an engine FADEC or an aircraft control system controller may be configured to perform the control functionality described herein. To facilitate the description herein, the term "controller 68" is used herein to refer to all of the various controller architectures unless otherwise noted. The controller 68 may include one or more processors in signal communication with a memory device. The processor may include any type of computing device, computational circuit, processor(s), CPU, computer, or the like capable of executing a series of instructions that are stored in the memory. Instructions can be directly executable or can be used to develop executable instructions. For example, instructions may be executable or non-executable machine code or a high-level language that can be compiled to produce executable or non-executable machine code, or any combination thereof. Instructions may include data. Instructions may be organized in any format, including routines, subroutines, programs, data structures, objects, modules, applications, applets, functions, etc. Instructions may include an operating system, and/or executable software modules such as program files, system data, buffers, drivers, utilities, and the like. The instructions may apply to any functionality described herein. The memory may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be integral with the controller 68 or may be independent of, but in communication with, the controller 68.

Some present disclosure EPR system 62 embodiments may include one or more sensors 76 (e.g., see FIG. 4) for sensing the ambient air entering the gas turbine engine 22, 122 for the presence or absence of entrained particles 70. The embodiment diagrammatically shown in FIG. 4 illustrates sensors 76 disposed in close proximity to the compressor inlet 50. Disposing the sensors 76 in close proximity to the compressor inlet 50 is understood to provide more accurate entrainment information that a sensor disposed further away from the compressor inlet 50, but such positioning is not required. The sensors 76 may be configured to produce signal communications representative of the concentration of entrained particles 70 within the airflow; e.g., for a given volume of airflow, the number of particles entrained therein. Some present disclosure EPR system 62 embodiments may also include one or more sensors for sensing the ambient air entering the gas turbine engine 22, 122 for the presence or absence of precipitation. A person of skill in the art will recognize that the potential for particle ingestion may be higher under certain operating conditions. For example, the potential for particle ingestion is higher during on-ground engine 22, 122 operation. The potential for particle ingestion may also be higher as a function of factors such as weather, season, and the like. The sensors 76 may be in signal communication with the signal processing hardware (e.g., a charge amplifier, a signal conditioner unit, or the like) which hardware may in turn be in signal communication with the controller 68 for data acquisition and processing. The EPR system 62 may be used efficiently based on sensor input; e.g., only operate the EPR system 62 when the entrained particulate level is above a predetermined threshold, and when the ambient air is not subject to precipitation above a predetermined level. In addition, the EPR system 62 may be controlled by external information input; e.g., weather data input, atmospheric data input, and the like. Upon receiving such input, the EPR system 62 may be controlled (e.g., via stored executable commands) to place the EPR system 62 in an on-state or in an off-state. In this mode, the EPR system 62 may be operated without sensor 76 input.

As indicated herein, in the operation of a gas turbine engine 22, 122, air is drawn into the core gas path of the engine 22, 122 and subsequently passes through the compressor, combustor, and turbine sections before exiting the engine 22, 122. In the absence of a system configured to remove entrained particulate matter, particulate matter (if present) may be drawn into the core gas path. Entrained particulate matter can be particularly problematic in the combustor section 38, 138 and the turbine section 40, 140 where component cooling is required. In many applications, engine cooling schemes use relatively small diameter cooling apertures to produce impingement cooling and/or to establish cooling air boundary layer flow adjacent to a component surface, or the like. In these instances, the diameter of the cooling aperture may be directly related to the desired cooling effect. In some instances, the diameter of the cooling aperture is limited by the potential for particulate fouling; i.e., a minimum diameter of a cooling aperture is selected to avoid fouling and a consequent cooling deficit. The present disclosure EPR system 62 is operable to remove particulate matter from air that may be drawn into the core gas path.

The present disclosure EPR system 62 may be operated pursuant to numerous different control configurations and combinations of the same. For example, in some embodiments the EPR system 62 may be controlled (pursuant to stored instructions executed by the controller 68) to operate during certain predetermined flight mission segments. The term "flight mission" is used herein to describe an operational mission of an aircraft 20; e.g., initial idling (with the aircraft 20 stationary), taxiing, takeoff, ascent, cruise, descent, landing, return taxing, and the like. The term "takeoff" as used herein refers to ground travel of the aircraft 20 that is intended to achieve liftoff from the ground. The term "landing" as used herein refers to ground travel of the aircraft 20 after the aircraft 20 has touched down to the ground. FIG. 10 diagrammatically illustrates a typical flight mission that begins with an initial idle/taxi segment at a first geographical location disposed at a first ground altitude. The term "ground altitude" refers to the altitude of the ground at a given location above sea level. FIG. 10 further illustrates an ascent segment that extends from the first ground altitude to a cruise segment disposed at a cruise altitude, and a descent segment that extends from the cruise altitude to a final idle/taxi segment disposed at a second geographical location at a second ground altitude. The first and second ground altitudes may differ from one another. The typical flight mission diagram shown in FIG. 10 has a single ascent segment, cruise segment, and descent segment to facilitate the description. A person of skill in the art will recognize that a flight mission may have several ascent, descent, and cruise segments. FIG. 10 further illustrates a single line representative of a predetermined flight altitude.

As another example, in some embodiments the EPR system 62 may be controlled to operate when the aircraft 20 system 62 is disposed in certain geographic locations (e.g., semi-arid locations with substantial dust) and not operate in other geographic locations (e.g., locations substantially free of dust). As yet another example, in some embodiments the EPR system 62 may be controlled to not operate when ambient conditions include precipitation above a predetermined amount, in which case a substantial amount of water is already being ingested by the engine 22,122. Controlling operation of the EPR system 62 (e.g., as described) can decrease the amount of fluid resources utilized.

As yet another example, in some embodiments the EPR system 62 may be controlled to operate during a flight mission segment when the aircraft 20 is exposed to air containing a substantial amount of particulate matter. For example, volcanic ash may be disposed in air at considerable altitudes; i.e., altitudes that do not typically include any appreciable particulate matter. In the event such contaminated air is encountered, the present disclosure may be utilized to remove the particulate manner and prevent it from being ingested in core gas flow.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A method of directing particles entrained within an airflow disposed to enter a gas turbine engine of an aircraft, the gas turbine engine including a nose cone, a fan section, a compressor inlet, a compressor section, and a turbine section, wherein the compressor section and the turbine section are in communication with a core gas path, and the nose cone is fixed for rotation with the fan section, the method comprising:
   providing an entrained particle removal (EPR) system configured to inject a fluid outward from the nose cone from a plurality of nozzles engaged with the nose cone; and
   controlling the EPR system to inject the fluid from the plurality of nozzles during at least one predetermined segment of a flight mission of the aircraft, the flight mission including an idling segment, a taxiing segment, a take-off segment, an ascent segment, a descent segment, and a landing segment;
   wherein particles wetted by the injected fluid are subject to centrifugal force in and aft of the fan section and are directed radially outward of the compressor inlet.

2. The method of claim 1, wherein the gas turbine engine is a turbofan engine disposed within a nacelle, and a bypass duct is disposed radially outside of the core gas path; and
   wherein particles wetted by the injected fluid are subject to centrifugal force in and aft of the fan section and are directed radially outward of the compressor inlet and into the bypass duct.

3. The method of claim 2, wherein the fluid is provided from a fluid source that is located externally to the nose cone.

4. The method of claim 1, wherein the gas turbine engine is in an open rotor configuration having an engine enclosure disposed radially outside of the compressor section and the turbine section; and
   wherein particles wetted by the injected fluid are subject to centrifugal force in and aft of the fan section and are directed radially outward of the compressor inlet and outside of the engine enclosure.

5. The method of claim 1, wherein the plurality of nozzles are spaced apart from one another around a circumference of the nose cone.

6. The method of claim 1, wherein the step of controlling the EPR system includes controlling a volumetric fluid flow rate of the fluid injected from the plurality of nozzles.

7. The method of claim 6, the method further comprising:
   sensing the airflow for the particles entrained within the airflow, and producing a sensor signal representative of the entrained particles within the airflow;
   wherein the step of controlling the EPR system includes controlling a volumetric fluid flow rate of the fluid injected from the plurality of nozzles based on the sensor signal representative of the entrained particles within the airflow.

8. The method of claim 1, wherein the step of controlling the EPR system includes controlling a magnitude of motive force applied to the fluid injected from the plurality of nozzles based on operating conditions of the gas turbine engine.

9. The method of claim 1, wherein the plurality of nozzles comprises a first nozzle and a second nozzle; and
   the step of controlling the EPR system includes applying a first magnitude of motive force to the fluid injected from the first nozzle, and applying a second magnitude of motive force to the fluid injected from the second nozzle, wherein the first magnitude is greater than the second magnitude.

10. The method of claim 1, further comprising the step of heating the fluid to a temperature above a freezing point of the fluid.

11. A method of directing particles entrained within an airflow disposed to enter a gas turbine engine of an aircraft, the gas turbine engine including a nose cone, a fan section, a compressor inlet, a compressor section, and a turbine section, wherein the compressor section and the turbine section are in communication with a core gas path, and the nose cone is fixed for rotation with the fan section, the method comprising:
   providing an entrained particle removal (EPR) system configured to inject a fluid outward from the nose cone from a plurality of nozzles engaged with the nose cone, wherein the plurality of nozzles are spaced apart from one another around a circumference of the nose cone; and
   controlling the EPR system to inject the fluid from the plurality of nozzles into the airflow;
   wherein particles wetted by the injected fluid are subject to centrifugal force in and aft of the fan section and are directed radially outward of the compressor inlet.

12. The method of claim 11, wherein the gas turbine engine is a turbofan engine disposed within a nacelle, and a bypass duct is disposed radially outside of the core gas path; and wherein particles wetted by the injected fluid are subject to centrifugal force in and aft of the fan section and are directed radially outward of the compressor inlet and into the bypass duct.

13. The method of claim 11, wherein the step of controlling the EPR system to inject the fluid from the plurality of nozzles into the airflow includes sensing the airflow for the particles entrained within the airflow, and producing a sensor signal representative of the entrained particles within the airflow.

14. The method of claim 13, wherein the step of controlling the EPR system includes controlling a volumetric fluid flow rate of the fluid injected from the plurality of nozzles based on the sensor signal representative of the entrained particles within the airflow.

15. The method of claim 11, wherein the step of controlling the EPR system to inject the fluid from the plurality of nozzles into the airflow utilizes atmospheric data or weather data input into the EPR system.

16. The method of claim 11, further comprising the step of heating the fluid to a temperature above a freezing point of the fluid.

17. The method of claim 11, wherein the gas turbine engine is in an open rotor configuration having an engine enclosure disposed radially outside of the compressor section and the turbine section; and wherein particles wetted by the injected fluid are subject to centrifugal force in and aft of the fan section and are directed radially outward of the compressor inlet and outside of the engine enclosure.

18. An aircraft, comprising:

a gas turbine engine having a nose cone, a fan section, a compressor inlet, a compressor section, and a turbine section arranged along an axial centerline, wherein the compressor section and the turbine section are in communication with a core gas path;

an entrained particle removal (EPR) system including a plurality of nozzles engaged with the nose cone, wherein the nozzles are configured to inject a fluid outward from the nose cone; and a controller in communication with the EPR system and a non-transitory memory storing instructions, which instructions when executed cause the controller to control the EPR system to provide the fluid to the nozzles for injection outward from the nozzles;

wherein the gas turbine engine is configured such that particles entrained within an airflow disposed to engage the gas turbine engine that are wetted by the fluid injected by the EPR system are directed radially outside of the compressor inlet.

19. The aircraft of claim 18, wherein the gas turbine engine is a turbofan type gas turbine engine disposed within a nacelle, wherein the nacelle defines a bypass duct, and wherein the gas turbine engine is configured such that particles entrained within the airflow that are wetted by the fluid injected by the EPR system are directed radially outside of the compressor inlet and into the bypass duct.

20. The aircraft of claim 18, wherein the gas turbine engine is an open rotor type gas turbine engine, and wherein the gas turbine engine is configured such that particles entrained within the airflow that are wetted by the fluid injected by the EPR system are directed radially outside of the compressor inlet and an engine enclosure disposed radially outside of the core gas path.

* * * * *